United States Patent [19]
Schieltz et al.

[11] Patent Number: 6,061,087
[45] Date of Patent: May 9, 2000

[54] OUTDOOR ENCLOSURE FOR VIDEO SURVEILLANCE SYSTEM

[75] Inventors: Steven W. Schieltz; John D. Wulf; Luis Anderson, all of Boca Raton, Fla.

[73] Assignee: Sensormatic Electronics Corporation, Boca Raton, Fla.

[21] Appl. No.: 09/116,455

[22] Filed: Jul. 16, 1998

[51] Int. Cl.[7] ................................................ H04N 7/18
[52] U.S. Cl. .......................................... 348/151; 348/373
[58] Field of Search ............................. 348/61, 143, 151, 348/152, 373

[56] References Cited

U.S. PATENT DOCUMENTS

| | | | |
|---|---|---|---|
| 4,320,949 | 3/1982 | Pagano | 348/143 |
| 4,414,576 | 11/1983 | Randmae | 348/143 |
| 4,984,089 | 1/1991 | Stiepel | 348/143 |
| 5,394,184 | 2/1995 | Anderson | 348/151 |
| 5,649,255 | 7/1997 | Schieltz et al. | 396/427 |
| 5,689,304 | 11/1997 | Jones | 348/143 |

Primary Examiner—Bryan Tung
Attorney, Agent, or Firm—Quarles & Brady LLP

[57] ABSTRACT

An outdoor enclosure for a video surveillance system comprises: a housing having an outer wall with an opening; an observation bubble disposed over the opening, the housing being adapted for supporting a video surveillance camera; and, first and second fans mounted in the enclosure to establish an air flow pattern when the fans are operating which circulates substantially unidirectionally around the video surveillance camera when the camera is disposed in the bubble, the circulating air flow pattern being substantially free of dead zones inside the bubble and efficiently conducting thermal energy from within the enclosure to the outer wall and to the bubble for subsequent dissipation outside the enclosure. The enclosure can comprise a temperature responsive heater mounted in the circulating air flow pattern adjacent to the fans, downstream from the heater and upstream from the bubble. The fans are substantially transversely aligned within the circulating air flow pattern.

37 Claims, 5 Drawing Sheets

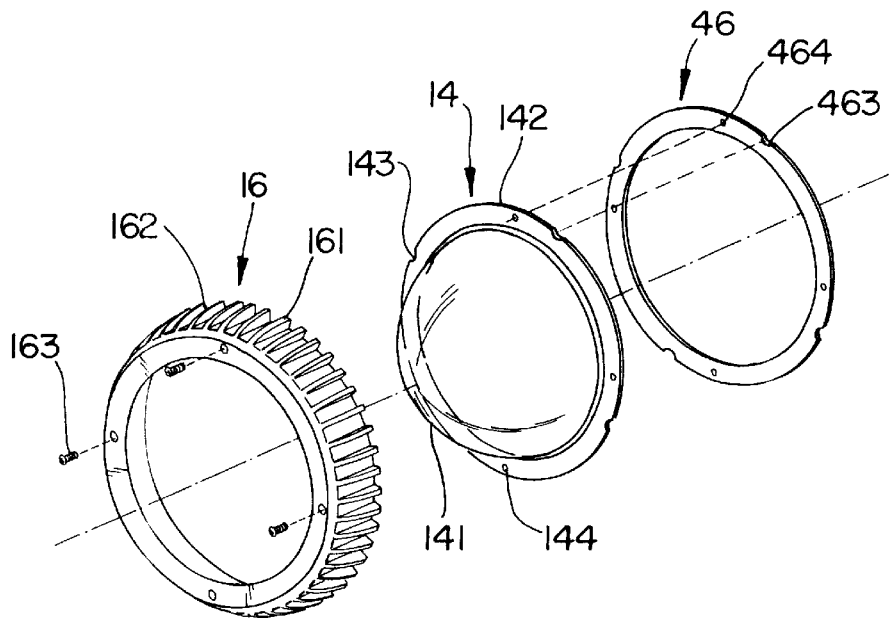
FIG. 4
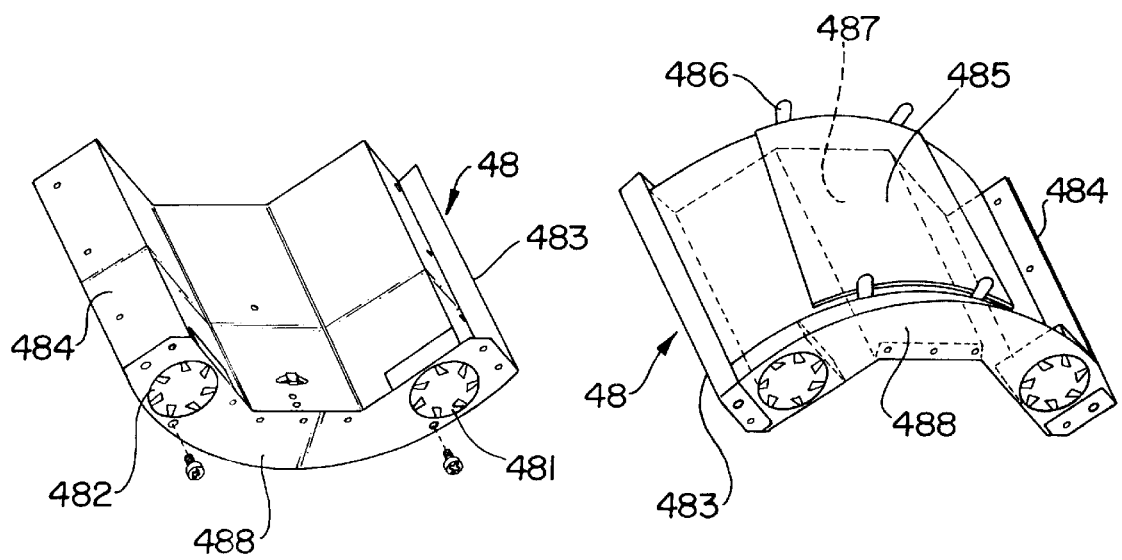
FIG. 5
FIG. 6

OUTDOOR ENCLOSURE FOR VIDEO SURVEILLANCE SYSTEM

BACKGROUND OF THE INVENTION

1. Field of the Invention

This invention relates to enclosures for video cameras in surveillance systems, and in particular, to an outdoor enclosure for a video camera in a surveillance system which can withstand a wide range of ambient temperatures and weather conditions without adversely affecting operation of the video camera. This invention also relates to video surveillance systems employing such outdoor video camera enclosures.

2. Description of Related Art

A long standing problem faced by those skilled in the art was to invent a environmentally sealed enclosure for a video surveillance dome camera that can operate over a wide range of ambient temperatures and weather conditions, for example over a temperature range of approximately −40° C. to +50° C., and weather conditions ranging from bright, sunny and hot to rain, snow and frigid temperatures. Further, such enclosures must operate with an input power level limited as a Class 2 power supply of only 80 VA or less, for safety reasons. Moreover, due to the size reduction of new surveillance dome cameras over previous products, it is desirable and necessary to reduce the size of the enclosure as compared to previous products. Such reductions in size greatly limit the size of fans that can be used in such enclosures to approximately 30 mm$^2$. The standard fans of this dimension are typically limited to 3.5 cubic feet per minute of volume air flow. This is a relatively small airflow that creates a challenge for a design to achieve the required cooling and heating at temperature extremes. In addition to the basic technical challenges, market pressures dictate that new enclosures should be more aesthetically pleasing and cost substantially less than existing designs. Besides being necessary to reduce the size because of the power limitation, it is desirable to improve the appearance by making it smaller, more stylish and less obtrusive. A final but critical challenge is to achieve high reliability, since it is generally difficult to access the surveillance cameras for servicing as they are usually at a high outdoor location.

Prior solutions use fans in various arrangements to blow warm air down over the bubble from many points equally spaced around the circumference of the bubble. This is to provide an even distribution of warm air over the bubble to provide for the melting of frost or ice. Many of these designs blow or draw air through a duct or tube that has a heater inside of it to produce the warm air. These designs require a larger fan than the size noted above, capable of the higher static pressures needed to produce a significant air velocity out of multiple points on a distribution manifold. Alternative designs have the fans mounted in relatively free space so as to draw air over a heater located in close proximity to the fan. This method allows the air that is exiting the fans to immediately return to the fan intake and does not promote air circulation through the entire housing and bubble. This poor circulation decreases the housing's ability to transfer heat out of the dome in warm environments, and to warm the optical surface of the housing in cold environments.

Outdoor video surveillance camera enclosures in accordance with the prior art are sold by Sensormatic Electronics Corporation, Pelco Corporation and Vicon Corporation. The camera mounting assembly utilized herein is described in U.S. Pat. No. 5,649,255—Schieltz, a coinventor herein.

SUMMARY OF THE INVENTION

The inventive arrangements taught herein are based in part upon the realization that the location of the fans, both in proximity to the bubble and location around the circumference of the bubble, are important. The inventive arrangements are also based in part on the realization that a heater enclosure assembly, within the overall enclosure, was needed to route the air flow in a most efficient manner for both cooling and heating. The following features each contribute to the success of the inventive arrangements, although various aspects of the inventive arrangements can embody different combinations of the features.

Fans, at least one fan and preferably two fans, are located relatively close to each other instead of being even spaced around the circumference of the bubble, which tends to be substantially hemispherical. This allows the fans to force air down to the bottom of the bubble and up the other side. Conventional designs evenly distribute the air, however the air streams collide with each other at bottom of the bubble, causing a dead air spot with greatly reduced airflow where it is needed most.

The fans are preferably placed down as low as possible with respect to the bubble without blocking the camera view. They are mounted transverse to the air flow, such that each fan blade axis is vertical. This is achieved by using small fans which do not need to be mounted at an angle, so the housing is not larger than is necessary to accommodate the video camera. This maximizes the amount of air that is circulated over the bubble because the short path between the fan output and the bubble surface is unobstructed.

An additional advantage of this location for the fans is that the fans can be viewed from below through the bubble, or by using the surveillance camera, to determine if they are operating. To enhance this ability to determine if the fans are operating correctly, telltale indicators made of a light flexible material that will flutter when in moving air can be placed below the fans.

The fans are mounted on the bottom of a curved heater enclosure assembly which can occupy up to one half of the circumference of the overall enclosure, and in particular, the housing to which the bubble and the video camera are mounted. The heater enclosure assembly preferably occupies up to one-fourth of the circumference, being disposed between the surveillance dome camera and the outer wall of the housing. The assembly defines an air channel long enough reach into the top part of the housing so as to force air to circulate from the top of the housing down through the heater assembly and over the heater, around the camera inside the bubble, and back up the other side of the housing. This forces the circulation of the air along the inside surfaces of the enclosure, with a minimal pressure drop across the fans, by drawing air from the top of the enclosure and exhausting it at the bottom. This effect of maximizing the air flow along the inside surfaces of the enclosure is critical for cooling, because the only means to remove heat is to conduct it to the outside through the enclosure walls, through the outer wall of the housing and the wall of the bubble. The outside wall of the heater assembly is open to the housing wall to additionally increase this cooling, and the housing can be made of aluminum, or a similar heat conductive material, to promote the heat conduction. Since the size of the fans are restricted by the enclosure's overall size and the size of the surveillance camera, it is important to not slow the air flow from the fans, in order that the air will project down into the bubble for purposes of warming the camera and melting ice and frost from the bubble. The assembly comprises a temperature responsive heater element for heating the air at cold temperatures. The assembly also acts as a safety shield to protect the service personnel from accidentally touching the heater during service, and it also provides safety in the case of fire, flames or melting material from falling out of the box in ease of a heater failure.

A completely solid state environmental control circuit can be used, the control circuit preferably including a solid state sensor and switch to turn on the heater when the temperature is below a specified temperature. This circuitry can be preferably designed to provide switching hysteresis, causing the heater to turn off at a temperature higher than the point at which it turns on, so as to prevent the circuitry from cycling on and off very rapidly. Optionally, the sensing element of the environmental control circuitry can be located outside the enclosure to more accurately sense when temperatures are below freezing, where ice could be blocking the camera view. This can be combined with internal sensors by circuitry allowing the heater to remain on as long as the heater did not overheat the camera when the temperature outside is below freezing. This reduces melting time and improves the ice melting ability.

The heater assembly is preferably a modular design, which can easily be removed for servicing. In addition, the heater assembly can be designed with optional versions that have larger heaters, more fans, fans with higher air flow capability, or combinations there of.

A breather port mounted on top of the housing, under the sun shield, allows air and water vapor to pass through easily, but does not allow water or dust to pass through. The sole purpose is to allow water vapor to leave the enclosure if the unit is installed in high humidity, thus preventing fog or condensation from forming inside the enclosure when the temperature drops below the dew point. This exchange of water vapor and air does not affect or interfere with the circulating air flow pattern inside the housing and the bubble.

The outside appearance of the enclosure can be enhanced with a stylish plastic injection molded sun shield. The sun shield provides a very unique appearance to the product and protects the inside aluminum enclosure from being heated by the sun through radiant heat transfer. A passage is formed between the housing and the sun shield, which enables convective air movement through the passage and over the housing, enabling more efficient heat dissipation. The bubble is sealed to the enclosure and connected to the sun shield with a trim ring that is also injection molded and designed to enhance the style of the product. In addition, the trim ring is a wind deflector, having vertical fins, or louvers, which direct any horizontal wind movement upward into the passage formed between the housing and the sun shield to further ventilate the passage and promote the heat dissipation.

The unique combination of these features allows the use of small fans to achieve the objectives of cooling the camera in a sealed housing at high temperatures, and warming the equipment and melting ice down inside the bubble during cold winter operation despite the imposed power limitations. The heater enclosure uniquely solves several issues with one part implementation. The heater enclosure directs the air to flow around the surveillance dome camera, allows the fans to be mounted so as to provide maximum air flow into the bubble, shields the heater providing safety factors, and provides for the convenience of a modular heater-fan assembly. Moreover, these features contribute to, rather than restrict the air flow that is essential for moving heat to the outside of the enclosure during warm weather and melting ice off the bubble in cold weather.

An outdoor enclosure for a video surveillance system, in accordance with an inventive arrangement, comprises: a housing having an outer wall with an opening; an observation bubble disposed over the opening, the housing being adapted for supporting a video surveillance camera; and, first and second fans mounted in the enclosure to establish an air flow pattern when the fans are operating which circulates substantially unidirectionally around the video surveillance camera when the camera is disposed in the bubble, the circulating air flow pattern being substantially free of dead zones inside the bubble and efficiently conducting thermal energy from within the enclosure to the outer wall and to the bubble for subsequent dissipation outside the enclosure.

The enclosure can further comprise a temperature responsive heater mounted in the circulating air flow pattern adjacent to the fans. The heater preferably has opposite heat radiating surfaces and the circulating air flow pattern flows over both the opposite surfaces.

The fans are advantageously positioned downstream from the heater and upstream from the bubble, with respect to the circulating air flow pattern, the fans being substantially transversely aligned within the circulating air flow pattern.

The enclosure advantageously comprises a subassembly for mounting the fans and the heater. The subassembly has a contour corresponding in shape to the outer wall of the housing and is mounted in the enclosure adjacent the outer wall. The subassembly forms respective heatable air flow passages, between the heater and the outer wall of the housing, and between the heater and the video camera.

Selective operation of the fans and selective operation of the heater enable the enclosure to provide an optimum environment for continuous operation of the video surveillance camera in ambient conditions ranging from approximately −40° C. to approximately +50° C.

The enclosure can advantageously further comprise: a sun shield overfitting the housing and forming an air passage between the shield and the housing, the passage having an air inlet surrounding the housing at a lower end of the shield; and, a cover for the sun shield forming an air outlet surrounding the housing at an upper end of the shield, whereby natural convection establishes a second air flow pattern through the passage for dissipating heat from the housing. A plurality of vertically oriented fins can be disposed circumferentially around the housing and sun shield adjacent the air inlet. The fins deflect wind impacting the enclosure through the air passage to promote the heat dissipation.

All electrical components in the enclosure operate at power levels not greater than that supplied by a Class 2 power supply.

The enclosure further comprises a vent for equalizing humidity levels inside of and outside of the enclosure, the enclosure being substantially sealed except for the vent, and the vent being too small to affect the air flow pattern.

The housing can be substantially cylindrical; and, the first fan, the second fan and the heater can be advantageously disposed in the same one-quarter circumferential portion of the substantially cylindrical housing.

An outdoor enclosure for a video surveillance system, in accordance with a further inventive arrangement, comprises: a housing having an outer wall with an opening; an observation bubble disposed over the opening, the housing being adapted for supporting a video surveillance camera; and, means for establishing an air flow pattern which circulates substantially unidirectionally around the video surveillance camera when the camera is disposed in the bubble, the circulating air flow pattern being substantially free of dead zones inside the bubble and efficiently conducting thermal energy from within the enclosure to the outer wall and to the bubble for subsequent dissipation outside the enclosure.

The enclosure can further comprising a temperature responsive heater mounted in the circulating air flow pattern.

The enclosure air flow establishing means is advantageously downstream from the heater and upstream from the bubble, with respect to the circulating air flow pattern.

The air flow establishing means can comprise at least one fan, and preferably two fans. The fans can be advantageously positioned to be substantially transversely aligned within the circulating air flow pattern.

The enclosure can advantageously comprise a subassembly for mounting the air flow establishing means and the heater, the subassembly having a contour corresponding in shape to the outer wall of the housing and being mounted in the enclosure adjacent the outer wall. The subassembly forms respective heatable air flow passages, between the heater and the outer wall of the housing, and between the heater and the video camera.

Selective operation of the air flow establishing means and selective operation of the heater enable the enclosure to provide an optimum environment for continuous operation of the video surveillance camera in ambient conditions ranging from approximately −40° C. to approximately +50° C.

The enclosure can further advantageously comprise: a sun shield overfitting the housing and forming an air passage between the shield and the housing, the passage having an air inlet surrounding the housing at a lower end of the shield; and, a cover for the sun shield forming an air outlet surrounding the housing at an upper end of the shield, whereby natural convection establishes a second air flow pattern through the passage for dissipating heat from the housing. A plurality of vertically oriented fins can be disposed circumferentially around the housing and sun shield adjacent the air inlet. The fins can deflect wind impacting the enclosure through the air passage to promote the heat dissipation.

All electrical components in the enclosure operate at power levels not greater than that supplied by a Class II power supply.

The enclosure can further comprise a vent for equalizing humidity levels inside of and outside of the enclosure, the enclosure being substantially sealed except for the vent, and the vent being too small to affect the air flow pattern.

The housing can be substantially cylindrical; and, the subassembly can advantageously be disposed in the same one-quarter circumferential portion of the substantially cylindrical housing.

An outdoor enclosure for a video surveillance system, in accordance with another inventive arrangement, comprises: a upper housing having a generally cylindrical outer wall with an opening; an observation bubble extending downwardly from and covering the opening, the enclosure being adapted for supporting a video surveillance camera; at least one fan mounted in the enclosure for establishing a first air flow pattern entirely within the housing and the bubble which conducts thermal energy into the outer wall of the housing for subsequent dissipation of the heat outside the enclosure; a sun shield overfitting the housing and forming an air passage between the shield and the housing, the passage having an air inlet surrounding the housing at a lower end of the shield; a cover for the sun shield forming an air outlet surrounding the housing at an upper end of the shield such that natural convection can establish a second air flow pattern through the passage, entirely outside of the housing and the bubble, for dissipating the thermal energy conducted to the outer wall of the housing by the first air flow pattern; and, an air deflector disposed circumferentially around the housing and sun shield adjacent the air inlet, the air deflector directing wind impacting the enclosure through the air passage to promote the heat dissipation.

The air deflector can advantageously comprise a plurality of vertically oriented fins.

The enclosure can further comprise a vent for equalizing humidity levels inside of and outside of the enclosure, the enclosure being substantially sealed except for the vent, and the vent being too small to affect the air flow pattern.

The housing can be substantially cylindrical, the air passage between the housing and the shield also being substantially cylindrical. The at least one fan and the heater can be advantageously disposed in the same one-quarter circumferential portion of the substantially cylindrical housing. Where the enclosure comprises two fans, the two fans and the heater are advantageously disposed in the circumferential portion.

In accordance with yet further inventive arrangements, each of the enclosures of each of the previously described inventive arrangements can be provided in combination with the video surveillance camera.

BRIEF DESCRIPTION OF THE DRAWINGS

FIG. 4 is an exploded view showing assembly of the wind deflector trim ring and the bubble observation dome.

FIG. 5 is an inside perspective view of a fan-heater assembly.

FIG. 6 is an outside perspective view of the fan-heater assembly shown in FIG. 3.

DETAILED DESCRIPTION OF THE PREFERRED EMBODIMENTS

Figure 1:
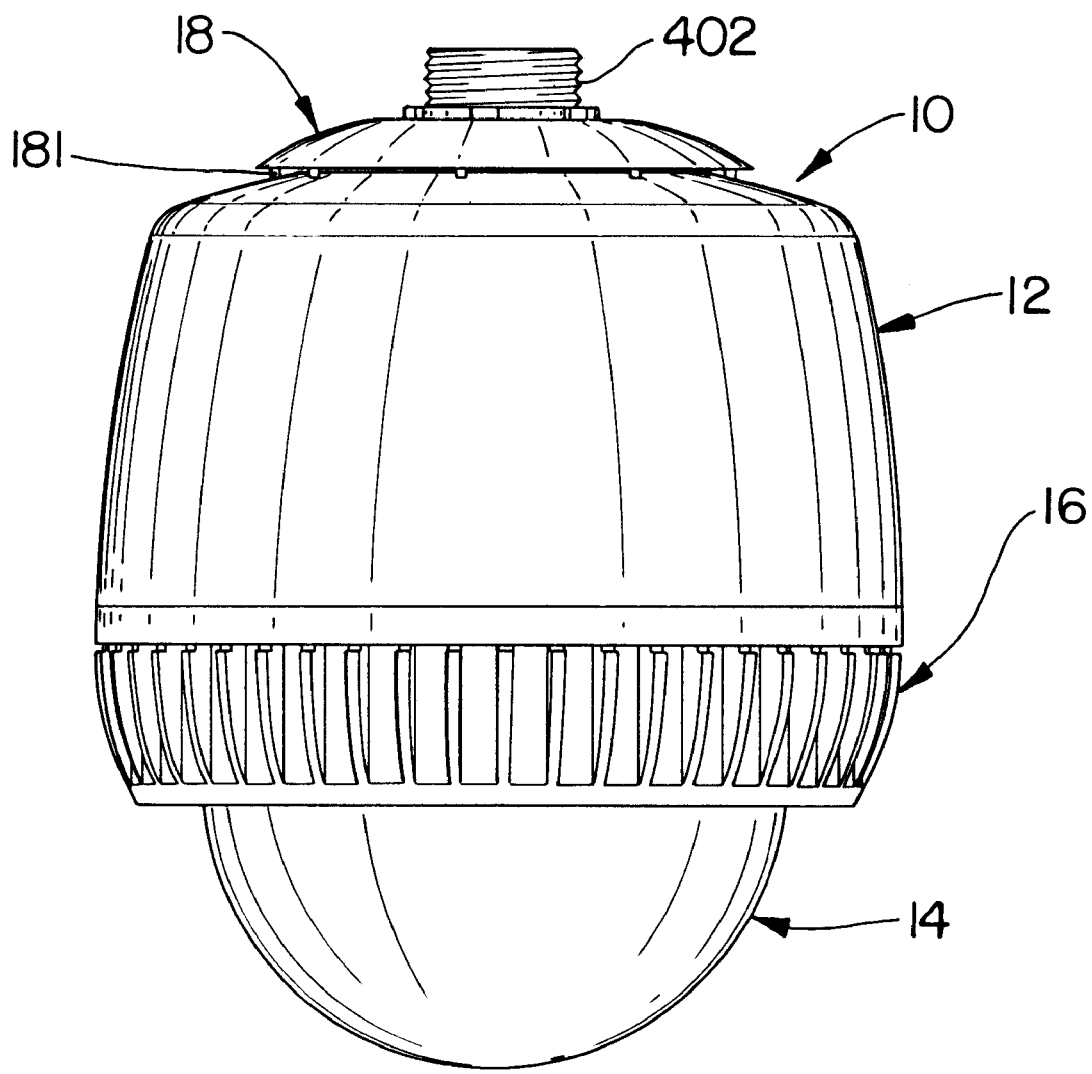
FIG. 1 is a side elevation of an outdoor enclosure for a video surveillance camera in accordance with the inventive arrangements, and the presently preferred embodiment.

An outdoor enclosure 10 for a video surveillance camera is shown in FIG. 1. The outer appearance of the enclosure is defined by a sun shield 12, a bubble observation dome 14, and trim ring 16 which advantageously serves as a wind deflector, and a cover 18. In the presently preferred embodiment, the sun shield 12 has a downwardly opening cup-shape with substantially cylindrical walls. A lower opening is closed by the bubble dome 14, which is substantially hemispherical. An opening in the top of the sun shield 12 is mostly but not completely closed by a cover 18. A video surveillance camera 20, shown diagrammatically in FIG. 2, can be rotatably mounted in the enclosure 10, so that the camera lens can scan outwardly through the bubble dome 14 as the camera pans, zooms and rotates under remote control, automatically and/or manually. The bubble dome 14 can be transparent or can be made to appear translucent by tinting or various gold or silver reflective coatings which do not interfere with the imaging capacity of the camera. It can be beneficial if the position of the camera cannot be determined by a casual analysis of the enclosure, which would otherwise make it possible to act of sight of the camera at the appropriate moment. The enclosure and the camera are supported by an assembly, described in detail in connection with other Figures, which includes a threaded pipe fitting 28, through which power lines and control wires can pass.

The compact size of the enclosure 10 can be appreciated from the following dimensions of the presently preferred embodiment. The diameter of the sun shield 12 at its lowest and widest part is approximately 243.5 mm. The radius of the bubble dome 14 is approximately 89 mm. The height of the sun shield 12, the trim ring 16 and the cover 18 is approximately 206.5 mm. The height of the bubble dome 14, the trim ring 16, the sun shield 12 and the cover 18 is approximately 284.5 mm. The pipe thread fitting 28 extends above the cover 18 by approximately 18.5 mm. The overall height, including the pipe fitting, is only approximately 303 mm.

The interior arrangement of the enclosure can be understood first with reference to FIGS. 2 and 3, and later, to FIGS. 2 and 4. The video camera 20 is mounted to a quick-connect, quick-disconnect mounting base 30, of the kind described in U.S. Pat. No. 5,649,255. Reference may be made to this patent for further details of this mounting system, which do not form a part of this invention in and of themselves.

A number of suitable video surveillance cameras are available from Sensormatic Electronics Corporation, under the designation Speed Dome Ultra. Such cameras are available in black and white or color, and in accordance with NTSC, PAL, CCIR and EIA standards.

Fitting 30 is secured to a C-shaped bracket 32, having a flat base 321 and outwardly extending arms 322 and 323. The arms have flanges 328, 329 to which the fitting 30 is attached. The base 321 has a central opening 326 through which wires for the video camera can pass freely. Base 321 is also provided with a rectangular array of four threaded studs 324, which are directed away from fitting 30. Finally, base 321 is provided with an opening 325, which forms part of an air passage for venting humidity.

An elastomeric gasket 34 is provided with an opening 346 corresponding to opening 326, and an array of holes 347 for receiving the threaded studs 324. Finally, the seal or gasket is provided with an opening 345 corresponding to opening 325. As a practical matter, the gasket is provided with two holes 345, so that the gasket can be applied without regard to left or right alignment. With respect to the sense of FIG. 3, fitting 30, bracket 32 and gasket 34 are secured in the order shown inside housing 22, and in particular, in alignment and engagement with a corresponding set of holes in the top 223 of the housing 22. The entire hole pattern is not shown in the drawing, but the final position of the fitting 30 can be seen in FIG. 7.

The housing 22 is provided with a substantially cylindrical outer wall 221, having a flange 222 extending therefrom. Housing 22 is also provided with two brackets 224, only one of which is visible in FIG. 3, for facilitating alignment and attachment of a heater-fan assembly 48, shown in FIGS. 5–7. Gasket 38 is a second elastomeric gasket identical to gasket 34, and having the rectangular array of holes 387, a central hole 386 and a vent hole aligned with holes 345 and 325.

An enclosure mounting bracket 40 having a base 401 and a threaded pipe section 402 is placed over gasket 38, against the outer surface of the top 223 of housing 22. The base 401 is provided with the same pattern of holes 405, 406 and 407 as gasket 38, flange 34, bracket 32 and the top 223 of housing 22. The threaded studs 324 of bracket 32 are long enough to extend through the holes in the base 401, enabling washers 403 and nuts 404 to firmly secure the parts thus far described to one another. A bushing 36 is adapted to be threadably inserted into the hole 406 of base 401, which is of a smaller diameter than holes 386, 346, 326 and the corresponding hole in the top 223 of housing 22. Bushing 36 is a conventional bushing through which wires for the camera pass into the housing. As the bushing 36 is threadably tightened into hole 406, the bushing clamps the wires in a manner which seals the opening in the top of the housing, acting together with gaskets 38 and 34. Hole 45 is adapted to threadably receive a vent member 408 which maintains a very small air passage between the interior and exterior of the housing 22, to enable just enough air to flow therethrough to equalize humidity levels inside and outside of the housing 22.

The use of a breather port allows the internal humidity to be equalized with the outside environment as the partial pressure of any internal water vapor in the air equalizes with the water vapor in the outside environment. Temperature changes due to the heater cycling and weather change cycles also will cause the air in the housing to expand and contract, thus forcing trapped humidity inside the housing to be equalized with the outside environment.

Placement of the fan or fans is as close as possible to the bubble, without blocking the camera view, and on a single side of the enclosure so as to cause the air movement to be down one side, across the bubble, and up the opposite side. This also advantageously places the heater and fan or fans for safety and service reasons. The fans and heater can be controlled responsive to air sensed at the top of the enclosure by an internal sensor, advantageously placed above that heater-fan assembly, and also, optionally, by an external sensor for outside ambient temperature. Telltales can be mounted on or near the fan(s). The ability to see the fans, or at least the telltales, to determine if the fans are operational, whether by observation through the bubble, or observation by the video camera, or possibly both, provides improved reliability and servicing.

The sun shield 12 has a substantially cylindrical wall 121, a lower, large opening 122 and a smaller, upper opening 126. The upper opening 126 is provided with three or four inwardly extending and equally spaced webs 124, the distal ends of which define an opening corresponding to the outer diameter of the threaded pipe section 402. Webs 124 assure that sun shield 12 will remain centered with respect to the axis of assembly shown in FIG. 3, which corresponds to a central axis of the entire enclosure 10.

Figure 2:
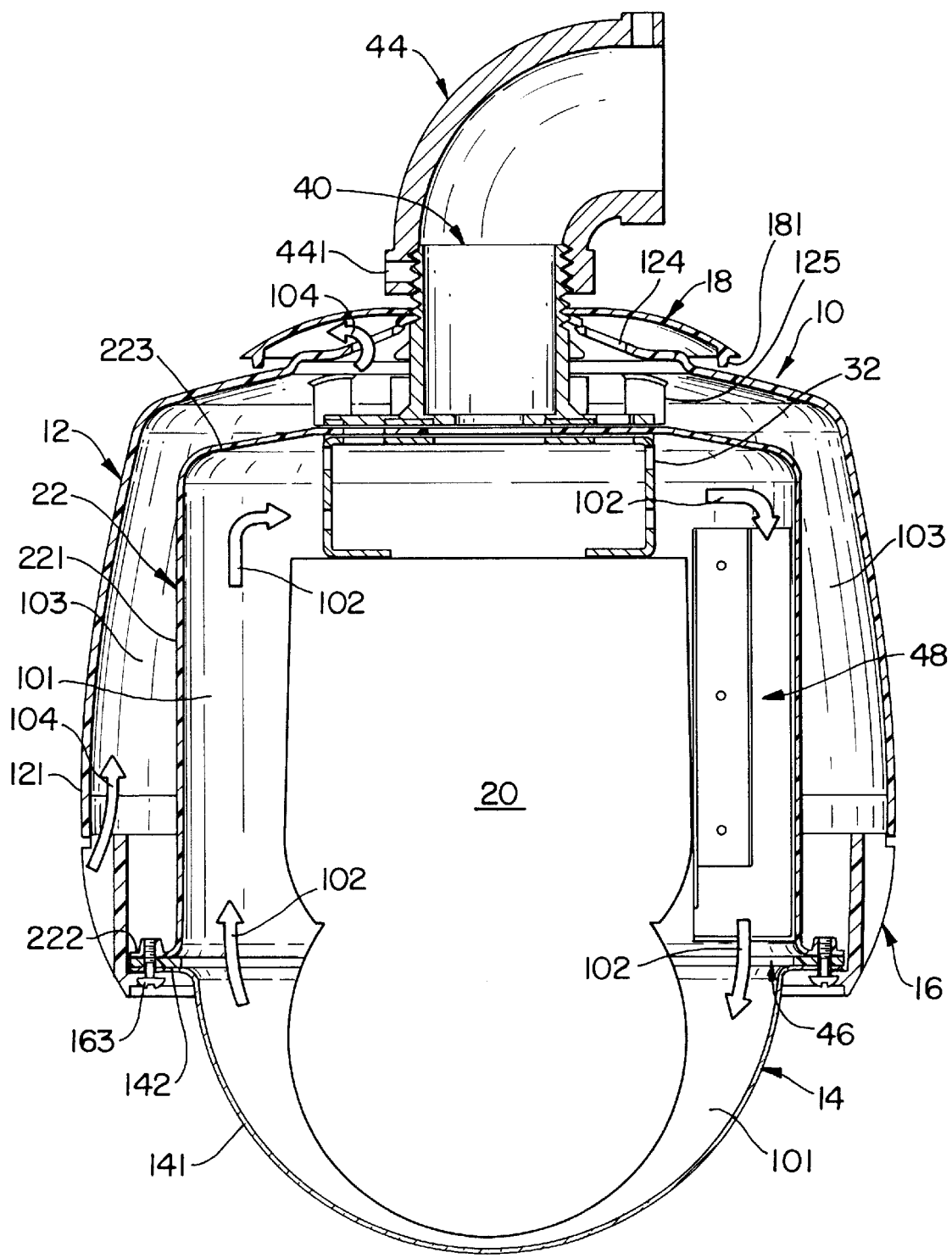
FIG. 2 is a section view showing the interior of the enclosure shown in FIG. 1.
Figure 3:
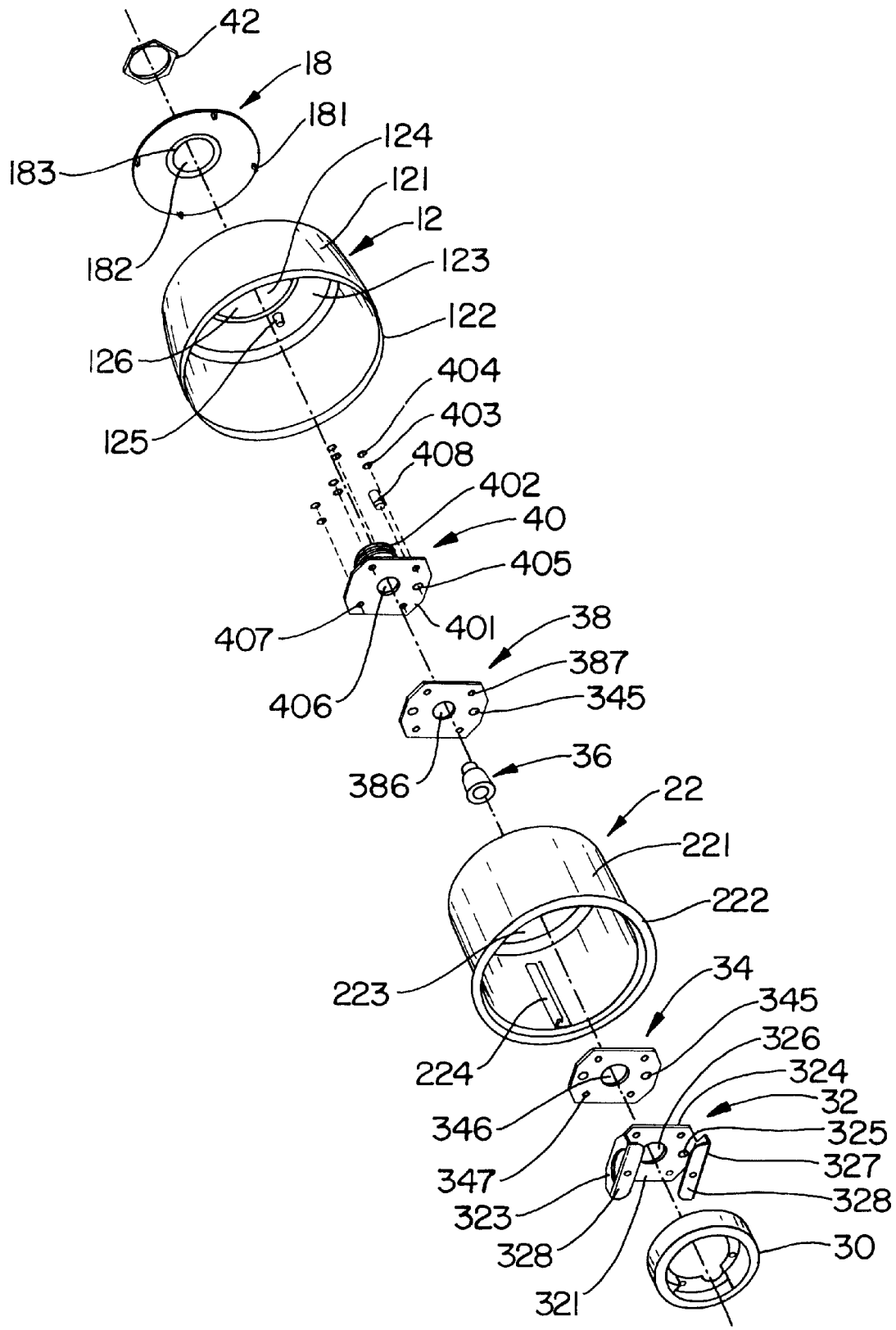
FIG. 3 is an exploded view of the housing, sun shield and camera mounting assembly.

It is necessary for the sun shield 12 to be spaced from the outer wall 221 of housing 22, in order to form an air passage 103 as indicated in FIG. 2. In order to prevent the sun shield from inadvertently closing off this passage, in whole or in part, several downwardly directed spacers 125 are adapted to rest on the top 223 of housing 22, as shown in FIG. 2.

The cover 18 has an opening 182 through which the threaded pipe section 402 can pass, and an inwardly directed rim section 183 defining opening 182. In order to prevent the air passage from being closed, in whole or in part, by cover 18, spacers 181 are adapted to prevent such closure, as shown in FIG. 2. The cover 18 and sun shield 12 are secured to the threaded pipe section 402, and thus to the housing 22, by nut 42.

It should be appreciated from the foregoing description that the weight of the video camera 20 is borne entirely by fitting 30, bracket 32, and mounting bracket 40. This rigid assembly also supports housing 22, sun shield 12 and cover 18. This enables housing 22 to be made from lightweight materials, such as aluminum, and enables the sun shield and cover to be made from lightweight plastic material.

With reference to FIGS. 2 and 4, the bubble dome 14 comprises a substantially hemispherical portion 141 and a flange 142. The flange is provided with a pattern of arcuate notches 143 and holes 144. The deflector and trim ring 16 is provided with a plurality of fins or louvers 161, holes 162 and mounting screws 163. Although not visible in FIG. 4, the obverse side of deflector 16 is provided with structure engaging the arcuate recesses 143 so that holes 144 align with holes 162. An elastomeric gasket 46 is provided with arcuate recesses 463 and holes 464. Gasket 46 can thus be aligned with ring 16 and flange 142. When assembled as shown in FIG. 2, the ring 16 and bubble dome 14 are sealably connected to the flange 222 of housing 22. It can thus be seen from FIG. 2 that the camera 20 is in a completely sealed chamber, except for the humidity control provided by vent 408. It can be noted that the bottom edge of sun shield 12 engages, and is held in position by the uppermost edge of deflector 16.

The fan-heater assembly 48 is shown in more detail in FIGS. 5 and 6. The fan-heater assembly has a generally arcuate form, and is configured to occupy not more than one-half, and preferably not more than one-fourth of the circumference of the housing 22 as shown by angle A in FIG. 7. A heater element 487 is disposed in a central portion of the assembly 48, between side flanges 483 and 484. A lower flange or shelf 488 supports first and second fans 481 and 482. The heater 487 can be adhesively attached. The adhesive attachment can be supplemented by tabs 486 which can be bent thereover. The placement of the heater 487 in the assembly 48 assures that the circulating air flow pattern 102 will flow over both sides of the heater 485, assuring maximum efficiency in heating the air, when heating is required.

Figure 7:
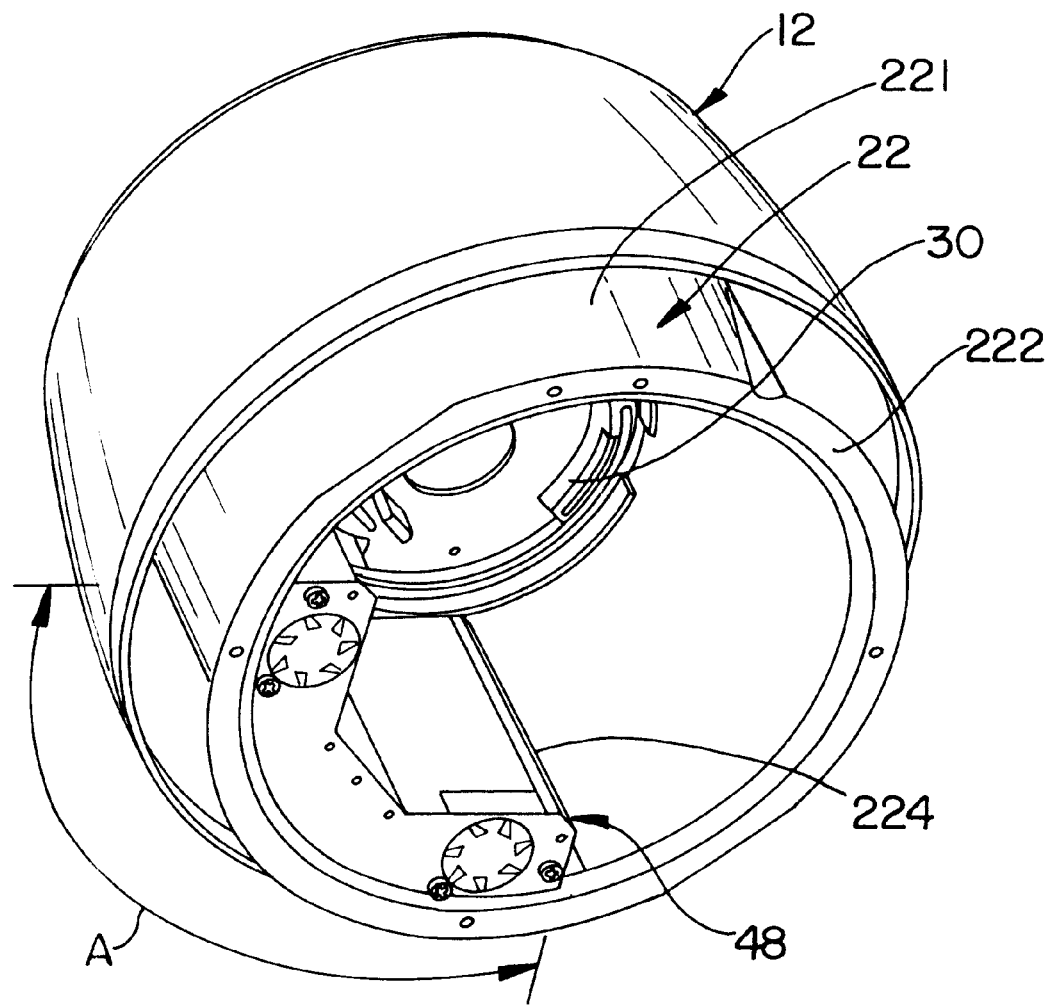
FIG. 7 is a perspective view of the interior of the housing showing the preferred placement of the fan-heater assembly.

When this assembly is mounted as shown in FIGS. 2 and 7, operation of the fans established a circulating air flow pattern shown by arrows 102. This air flow pattern provides substantially even distribution of heat within the sealed chamber formed by housing 22 and bubble dome 14. Thermal energy in the circulating air flow pattern engages the walls of housing 22 and bubble dome 14, enabling thermal energy to be conducted therethrough and dissipated from the sealed chamber. The bubble dome is exposed directly to the atmosphere. Dissipation of thermal energy through the wall of the housing 22 is accomplished by air moving through the passage 103 formed between the housing 22 and the sun shield 12, as indicated by arrows 104. Under ordinary circumstances, convection will result in an upwardly moving air flow pattern which assists in dissipating thermal energy. Whenever the enclosure is impacted by wind, air will be deflected upwardly into the passage 103 by the fins or louvers 61, to promote and enhance the heat dissipation.

In cold ambient conditions, operation of the heater 487 can prevent formation of ice and frost on the bubble dome 14, which would interfere with operation of the video camera. The heater and fans are preferably automatically controlled by a thermostat, preferably a solid state control, which can be mounted in the housing and which can enable the video camera to operate properly over a temperature range of approximately −40° C. to approximately +50° C., notwithstanding the limited input power of a Class 2 power supply of 80 VA or less. The control circuit can be responsive to temperature inside the enclosure and can also be responsive to temperature outside the enclosure, for example responsive to solid state temperature sensors. Such solid state controls and sensors are known in the art, and are omitted for purposes of clarity. If necessary, reference can be made to thermostatic control systems utilized by Sensormatic Electronics Corporation in existing products.

Referring to FIG. 2, enclosure 10 can be supported by a pipe fitting 44 threadably attached to threaded pipe section 402. Although the pipe fitting illustrated is a right-angle fitting, straight fittings can also be utilized depending upon the mounting requirements. The fitting is provided with a threaded opening 441 for receiving a set screw, for safety purposes.

Overall, the enclosure 10 in accordance with the inventive arrangements taught herein overcomes all of the problems described in connection with the prior art, and enables safe and efficient use of a video surveillance camera in an outdoor location over a wide range of ambient temperature and weather conditions, with limited power requirements. Moreover, the enclosure 10 in accordance with the inventive arrangements is both compact and attractive.

What is claimed is:

1. An outdoor enclosure for a video surveillance system, said enclosure comprising:

a housing having an outer wall with an opening;

an observation bubble disposed over said opening, said housing being adapted for supporting a video surveillance camera; and, at least one fan mounted in said housing to establish an air flow pattern when said fan is operating which circulates air exclusively from within said housing substantially unidirectionally around an interior surface of said bubble and continuing along an interior surface of said outer wall of said housing, said circulating air flow pattern being substantially free of dead zones inside said bubble and efficiently conducting thermal energy from within said housing to said outer wall and to said bubble for subsequent dissipation outside said enclosure.

2. The enclosure of claim 1, further comprising a temperature responsive heater mounted in said circulating air flow pattern adjacent to said fan.

3. The enclosure of claim 2, wherein said fan is downstream from said heater and upstream from said bubble, with respect to said circulating air flow pattern.

4. The enclosure of claim 2, wherein said heater has opposite heat radiating surfaces and said circulating air flow pattern flows over both said opposite surfaces.

5. The enclosure of claim 2, further comprising a subassembly for mounting said fan and said heater, said subassembly having a contour corresponding in shape to said outer wall of said housing and being mounted in said housing adjacent said outer wall, said subassembly forming respective heatable air flow passages, between said heater and said outer wall of said housing, and between said heater and said video camera.

6. The enclosure of claim 5, wherein:

said housing is substantially cylindrical; and, said fan and said heater are disposed in the same one-quarter circumferential portion of said substantially cylindrical housing.

7. The enclosure of claim 2, wherein selective operation of said fan and selective operation of said heater enable said enclosure to provide an optimum environment for continuous operation of said video surveillance camera in ambient conditions ranging from approximately −40° C. to approximately +50° C.

8. The enclosure of claim 2, wherein all electrical components in said enclosure operate at power levels not greater than that supplied by a Class 2 power supply.

9. The enclosure of claim 1, wherein said fan is substantially transversely aligned within said circulating air flow pattern.

10. The enclosure of claim 1, further comprising:
   a sun shield overfitting said housing and forming an air passage between said shield and said housing, said passage having an air inlet surrounding said housing at a lower end of said shield; and,
   a cover for said sun shield forming an air outlet surrounding said housing at an upper end of said shield, whereby natural convection establishes a second air flow pattern through said passage, distinct from said airflow pattern within said housing, for dissipating heat from said housing.

11. The enclosure of claim 10, further comprising a plurality of vertically oriented fins disposed circumferentially around said housing and sun shield adjacent said air inlet, said fins deflecting wind impacting said enclosure through said air passage to promote said heat dissipation.

12. The enclosure of claim 1, further comprising a vent for equalizing humidity levels inside of and outside of said enclosure, said enclosure being substantially sealed except for said vent, and said vent being too small to affect said air flow pattern.

13. The enclosure of claim 1, wherein:
   said housing is substantially cylindrical; and,
   said fan and said heater are disposed in the same one-quarter circumferential portion of said substantially cylindrical housing.

14. An outdoor enclosure for a video surveillance system, said enclosure comprising:
   a housing having an outer wall with an opening;
   an observation bubble disposed over said opening, said housing being adapted for supporting a video surveillance camera; and,
   means for establishing an air flow pattern in said housing which circulates air exclusively from within said housing substantially unidirectionally around an interior surface of said bubble and continuing along an interior surface of said outer wall of said housing, said circulating air flow pattern being substantially free of dead zones inside said bubble and efficiently conducting thermal energy from within said housing to said outer wall and to said bubble for subsequent dissipation outside said enclosure.

15. The enclosure of claim 14, further comprising a temperature responsive heater mounted in said circulating air flow pattern.

16. The enclosure of claim 15, wherein said air flow establishing means is downstream from said heater and upstream from said bubble, with respect to said circulating air flow pattern.

17. The enclosure of claim 15, further comprising a subassembly for mounting said air flow establishing means and said heater, said subassembly having a contour corresponding in shape to said outer wall of said housing and being mounted in said enclosure adjacent said outer wall, said subassembly forming respective heatable air flow passages, between said heater and said outer wall of said housing, and between said heater and said video camera.

18. The enclosure of claim 17, wherein:
   said housing is substantially cylindrical; and,
   said subassembly disposed in the same one-quarter circumferential portion of said substantially cylindrical housing.

19. The enclosure of claim 15, wherein selective operation of said air flow establishing means and selective operation of said heater enable said enclosure to provide an optimum environment for continuous operation of said video surveillance camera in ambient conditions ranging from approximately −40° C. to approximately +50° C.

20. The enclosure of claim 15, wherein all electrical components in said enclosure operate at power levels not greater than that supplied by a Class 2 power supply.

21. The enclosure of claim 15, further comprising a solid state control circuit for said air flow establishing means and said heater.

22. The enclosure of claim 21, wherein said control circuit is responsive to temperature within said enclosure.

23. The enclosure of claim 22, wherein said control circuit is also responsive to temperature outside of said enclosure.

24. The enclosure of claim 14, wherein said air flow establishing means comprises at least one fan.

25. The enclosure of claim 14, wherein said air flow establishing means comprises two fans, substantially transversely aligned within said circulating air flow pattern.

26. The enclosure of claim 14, further comprising:
   a sun shield overfitting said housing and forming an air passage between said shield and said housing, said passage having an air inlet surrounding said housing at a lower end of said shield; and,
   a cover for said sun shield forming an air outlet surrounding said housing at an upper end of said shield, whereby natural convection establishes a second air flow pattern through said passage, distinct from said airflow pattern within said housing, for dissipating heat from said housing.

27. The enclosure of claim 26, further comprising a plurality of vertically oriented fins disposed circumferentially around said housing and sun shield adjacent said air inlet, said fins deflecting wind impacting said enclosure through said air passage to promote said heat dissipation.

28. The enclosure of claim 14, further comprising a vent for equalizing humidity levels inside of and outside of said enclosure, said enclosure being substantially sealed except for said vent, and said vent being too small to affect said air flow pattern.

29. The enclosure of claim 14, further comprising tell tales for said fans mounted in view of said video surveillance camera when said camera is disposed in said bubble.

30. The enclosure of claim 15, wherein said air flow establishing means is disposed as low as possible without blocking any view of said video surveillance camera out of said bubble when said camera is disposed in said bubble.

31. The enclosure of claim 14, wherein said at least one fan is disposed as low as possible without blocking any view of said video surveillance camera out of said bubble when said camera is disposed in said bubble.

32. The enclosure of claim 14, further comprising tell tales for said at least one fan mounted in view of said video surveillance camera when said camera is disposed in said bubble.

33. An outdoor enclosure for a video surveillance system, said enclosure comprising:
   a upper housing having a generally cylindrical outer wall with an opening;
   an observation bubble extending downwardly from and covering said opening, said enclosure being adapted for supporting a video surveillance camera;

at least one fan mounted in said enclosure for establishing a first air flow pattern entirely within said housing and said bubble which conducts thermal energy into said outer wall of said housing for subsequent dissipation of said heat outside said enclosure;

a sun shield overfitting said housing and forming an air passage between said shield and said housing, said passage having an air inlet surrounding said housing at a lower end of said shield;

a cover for said sun shield forming an air outlet surrounding said housing at an upper end of said shield such that natural convection can establish a second air flow pattern through said passage, entirely outside of said housing and said bubble, for dissipating said thermal energy conducted to said outer wall of said housing by said first air flow pattern; and, an air deflector disposed circumferentially around said housing and sun shield adjacent said air inlet, said air deflector directing wind impacting said enclosure through said air passage to promote said heat dissipation.

34. The enclosure of claim 33, wherein said air deflector comprises a plurality of vertically oriented fins.

35. The enclosure of claim 33, further comprising a vent for equalizing humidity levels inside of and outside of said enclosure, said enclosure being substantially sealed except for said vent, and said vent being too small to affect said air flow pattern.

36. The enclosure of claim 33, wherein:

said housing is substantially cylindrical and said air passage between said housing and said shield is substantially cylindrical; and, said at least one fan and said heater are disposed in the same one-quarter circumferential portion of said substantially cylindrical housing.

37. The enclosure of claim 36, comprising two fans, said two fans and said heater being disposed in said circumferential portion.

* * * * *